United States Patent
Soneda et al.

(10) Patent No.: US 9,485,705 B2
(45) Date of Patent: Nov. 1, 2016

(54) TRANSMISSION CONTROL METHOD AND TRANSMISSION CONTROL APPARATUS

(71) Applicant: FUJITSU LIMITED, Kawasaki-shi, Kanagawa (JP)

(72) Inventors: Tatsuya Soneda, Fukuoka (JP); Koki Mie, Fukuoka (JP); Katsuhiko Yamatsu, Fukuoka (JP); Yuji Higashihara, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 253 days.

(21) Appl. No.: 14/256,485

(22) Filed: Apr. 18, 2014

(65) Prior Publication Data

US 2014/0226566 A1 Aug. 14, 2014

Related U.S. Application Data

(63) Continuation of application No. PCT/JP2011/075206, filed on Nov. 1, 2011.

(51) Int. Cl.
| | |
|---|---|
| *H04W 40/02* | (2009.01) |
| *H04L 12/703* | (2013.01) |
| *H04W 28/02* | (2009.01) |
| *H04W 40/00* | (2009.01) |
| *H04W 40/24* | (2009.01) |
| *H04W 84/18* | (2009.01) |

(52) U.S. Cl.
CPC ......... *H04W 40/02* (2013.01); *H04W 28/0289* (2013.01); *H04W 40/00* (2013.01); *H04L 45/28* (2013.01); *H04W 40/24* (2013.01); *H04W 84/18* (2013.01)

(58) Field of Classification Search
CPC ....... H04L 45/22; H04L 45/28; H04L 45/24; H04L 45/54; H04W 40/00; H04W 40/02
See application file for complete search history.

(56) References Cited

U.S. PATENT DOCUMENTS

| | | | | |
|---|---|---|---|---|
| 7,248,589 | B2* | 7/2007 | Banerjee | H04L 29/06 370/395.32 |
| 7,739,497 | B1* | 6/2010 | Fink | H04L 29/12433 713/153 |
| 2011/0019535 | A1* | 1/2011 | Nakashima | H04L 41/12 370/218 |
| 2011/0141932 | A1* | 6/2011 | Iwao | H04L 45/02 370/252 |

(Continued)

FOREIGN PATENT DOCUMENTS

| | | |
|---|---|---|
| JP | 2007-181056 | 7/2007 |
| JP | 2006-174118 | 6/2008 |

(Continued)

OTHER PUBLICATIONS

International Search Report, mailed in connection with PCT/JP2011/075206 and mailed Dec. 6, 2011.

*Primary Examiner* — Scott M Sciacca

(74) *Attorney, Agent, or Firm* — Fujitsu Patent Center

(57) ABSTRACT

A node transmits data based on a routing information table when receiving the data. The node determines whether a second candidate neighboring node of which flag information is true and to which the data has not yet been transmitted is present when the data transmission to a first candidate neighboring node fails. The node aborts retransmission of the data when no second candidate neighboring node of which the flag information is true and to which the data has not yet been transmitted is present.

4 Claims, 9 Drawing Sheets

(56) References Cited

U.S. PATENT DOCUMENTS

| | | | |
|---|---|---|---|
| 2011/0149978 A1* | 6/2011 | Moser | H04L 45/02 370/400 |
| 2011/0261706 A1* | 10/2011 | Fujiwara | H04B 3/54 370/252 |
| 2012/0106552 A1* | 5/2012 | Iwao | H04L 45/36 370/392 |
| 2012/0188968 A1* | 7/2012 | Mie | H04L 45/026 370/329 |

FOREIGN PATENT DOCUMENTS

| JP | WO 2009130918 A1 * | 10/2009 | ............ H04L 45/02 |
|---|---|---|---|
| JP | 2010-212758 | 9/2010 | |

* cited by examiner

| GD | LD | FLAG INFORMATION |
|---|---|---|
| GW 5 | GW 5 | - |
|  | 100e | TRUE |

140b

| GS | GD | LS | LD | FRAME ID | ... |

| GS | GD | LS | LD | FRAME ID | USER DATA | ... |

| GD | LD | FLAG INFORMATION |
|---|---|---|
| GW 5 | 100f | - |
|  | 100d | FALSE |

FIG.9

| GD | LD | FLAG INFORMATION |
|---|---|---|
| GW 5 | GW 5 | - |
| | 100a | FALSE |
| | 100d | FALSE |
| | 100f | FALSE |
| | 100e | FALSE |
| | 100c | FALSE |

| GD | LD | FLAG INFORMATION |
|---|---|---|
| GW 5 | 100b | - |
| | 100a | FALSE |
| | 100d | FALSE |
| | 100c | FALSE |
| | 100e | FALSE |

140b

TRANSMISSION CONTROL METHOD AND TRANSMISSION CONTROL APPARATUS

CROSS-REFERENCE TO RELATED APPLICATION

This application is a continuation of International Application No. PCT/JP2011/075206, filed on Nov. 1, 2011, the entire contents of which are incorporated herein by reference.

FIELD

The embodiment discussed herein is directed to a transmission control method and others relevant thereto.

BACKGROUND

An example of a configuration of a conventional ad-hoc network will be described. FIG. 13 is a diagram illustrating an example of the configuration of a conventional ad-hoc network. As illustrated in FIG. 13, the ad-hoc network includes a network server 1, a gateway (GW) 5, and nodes 10a to 10e and 10Y. The network server 1 and the GW 5 are connected with each other via a network 50. The nodes 10a to 10e and 10Y perform wireless communication with neighboring nodes thereof. In the following description, the nodes 10a to 10e and 10Y are collectively described as node 10 as needed.

The node 10 transmits and receives a hello message with neighboring nodes at fixed intervals to calculate communication quality of each route. The hello message includes routing information and communication quality information of a link between nodes. The node 10 constructs a plurality of routes to a final destination and decides an optimum route based on the calculation result of communication quality.

The node 10 further recalculates the communication quality of each route in the constructed routes by the actual performance in data communication and the periodic transmission and reception of a hello message with the neighboring node. The node 10 learns an optimum route and appropriately changes the communication route based on the result of recalculation.

FIGS. 14 to 16 are diagrams for explaining an example of the conventional nodes constructing routes. An example of constructing routes from the node 10Y to the GW 5 will be described here. The node 10 is assumed to hold a routing information table and a link table. The routing information table stores therein a route of good communication quality out of the routes reaching the final destination. The link table stores therein the information on the nodes that are wirelessly communicable with the node 10.

Now, a description will be made with reference to FIG. 14. The GW 5 generates and broadcasts a hello message based on the routing information table that the GW 5 holds when it comes to the timing of transmitting the hello message of the GW 5. The nodes 10a to 10c receive the hello message from the GW 5.

When the nodes 10a to 10c receive the hello message, the nodes 10a to 10c register the GW 5 as the destination in the respective routing information tables that the nodes 10a to 10c hold. The nodes 10a to 10c further calculate the communication quality with the routing information, the communication quality information, and others included in the hello message, and register the respective calculation results in the routing information tables and the link tables thereof.

The nodes 10a to 10c are assumed not to rebroadcast the hello message received from the GW 5.

Now, a description will be made with reference to FIG. 15. The node 10b generates and broadcasts a hello message based on the routing information table that the node 10b holds when it comes to the timing of transmitting the hello message of the node 10b. The nodes 10a, 10c, 10d, 10e, and 10Y receive the hello message from the node 10b. The GW 5 also receives the hello message from the node 10b. For example, when the node 10Y receives the hello message, the node 10Y registers that the route addressed to the GW 5 is via the node 10b in the routing information table that the node 10Y holds. The node 10Y further calculates the communication quality with the routing information, the communication quality information, and others included in the hello message, and registers the result of calculation in the routing information table and the link table.

A description will be made with reference to FIG. 16. In the same manner as that of the node 10b, the nodes 10d and 10e broadcast hello messages when it comes to the timing of transmitting the hello message of the nodes 10d and 10e, and the node 10Y receives the hello message. Consequently, the node 10Y is able to construct candidate communication routes 6a to 6c addressed to the GW 5. The node 10Y decides an optimum route to the GW 5 by the respective route quality and others of the candidate communication routes 6a to 6c.

In the above-described ad-hoc network, a plurality of routes are normally constructed, and thus even when one route is interrupted by a node abnormality, switching to another route permits data to be delivered to the final destination.

For example, in FIG. 16, it is assumed that an abnormality occurs to the node 10b while the node 10Y is using the communication route 6b as the optimum route to reach the GW 5. In this case, switching to the communication route 6a or 6c enables the node 10Y to deliver the data to the GW 5.

Conventional technologies are described in Japanese Laid-open Patent Publication No. 2007-181056 and Japanese Laid-open Patent Publication No. 2006-174118, for example.

In the above-described conventional technology, however, congestion may occur.

The following describes the reason why the congestion occurs. In the conventional ad-hoc network, when the route to the final destination is interrupted due to a node abnormality or the like, the route is switched and the data is retransmitted. Each node 10 here holds only the information on the neighboring nodes reaching the final destination. Therefore, even it is clear that the final destination is not reachable by switching routes when the network is viewed as a whole, the node alone is not able to determine that, and thus each node repeats the retransmission of data by switching the routes.

FIGS. 17 to 19 are diagrams for explaining an example of the occurrence of congestion. In the example illustrated in FIGS. 17 to 19, it is assumed that a plurality of routes are registered in the routing information table by the transmission and reception of a hello message. It is further assumed that the link between the GW 5 and the node 10b is cut off by temporal environmental changes.

Next, a description will be made with reference to FIG. 17. The situation described here is when the node 10Y transmits data addressed to the GW 5 as the final destination. The node 10Y refers to the routing information table to select an optimum route, and transmits the data to the neighboring node 10b, for example. The node 10b receives the data from the node 10Y. The node 10*b* then refers to the routing information table to select an optimum route and transmits the data to the GW 5. However, the link between the GW 5 and the node 10*b* is cut off, and thus the node 10*b* fails to perform the data transmission.

A description will be now made with reference to FIG. 18. The node 10*b* refers to the routing information table, switches routes, and transmits the data to the node 10*d*. The node 10*d* receives the data from the node 10*b*. The node 10*d* then refers to the routing information table to select an optimum route and transmits the data to the node 10*a*. The node 10*a* receives the data from the node 10*d*. The node 10*a* refers to the routing information table to select an optimum route and transmits the data to the node 10*b*. The node 10*b* receives the data from the node 10*a*.

A description will be made with reference to FIG. 19. The node 10*b* refers to the routing information table and selects an unselected route out of the optimum routes reaching the GW 5. For example, the node 10*b* transmits the data to the node 10*e*. The node 10*e* receives the data from the node 10*b*. The node 10*e* then refers to the routing information table to select an optimum route and transmits the data to the node 10*d*. The node 10*d* receives the data from the node 10*e*. The node 10*d* refers to the routing information table and selects an unselected route out of the optimum routes reaching the GW 5. The node 10*d* transmits the data to the node 10*b*, for example.

As illustrated in FIGS. 17 to 19, when the link to the final destination is cut off, the data is never delivered to the final destination even when the data is transmitted by switching routes, and thus the switching of routes frequently occurs, thereby causing the congestion to take place. This occurs regardless of the number of nodes in the whole network, and thus it occurs even in a small-scale network as well as in a large-scale network.

In FIGS. 17 to 19, the situation of the node 10Y being the transmission source of data has been described. Consequently, when the nodes other than the node 10Y transmit the data addressed to the GW 5, much more pieces of data are to be transmitted and received via the network.

It is conceivable that the node 10 is configured to hold the routing information from the node 10 to the final destination and to determine whether to perform data transmission. In this case, however, the amount of data in the routing information table may be enormous, and thus the operation in a large-scale network is likely to be difficult.

SUMMARY

According to an aspect of an embodiment, a transmission control method performed by a node constituting an ad-hoc network, the transmission control method includes transmitting data to a first candidate neighboring node for a destination of data selected by referring to a routing information table stored in a storage module, the routing information table associating the destination of data with a neighboring node and flag information indicative of whether a route reaching the destination from the neighboring node is effective; determining whether a route reaching the destination from a second candidate neighboring node other than the first candidate neighboring node for the destination of data is effective based on flag information of the second candidate neighboring node by referring to the routing information table when the transmitting of the data fails; retransmitting the data to the second candidate neighboring node when the second candidate neighboring node for which the route reaching the destination from the second candidate neighboring node is effective is present as a result of the determining; and aborting the retransmitting of the data when no second candidate neighboring node for which the route reaching the destination from the second candidate neighboring node is effective is present.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a table illustrating an example of data structure of the routing information table for a node 100*b*;

FIG. 10 is a table illustrating an example of data structure of the routing information table for a node 100*f*;

DESCRIPTION OF EMBODIMENT

Preferred embodiments of the present invention will be explained with reference to accompanying drawings. The invention, however, is not intended to be restricted by the embodiment.

[a] First Embodiment

The following describes the configuration of an ad-hoc network in a first embodiment. In the first embodiment, the ad-hoc network is assumed to use a proactive routing protocol, as one example. In the ad-hoc network, each node holds in advance the information on neighboring nodes to which data is transmitted to make the data reach a given destination as a routing information table. The given destination corresponds to a gateway (GW), for example.

Figure 1:
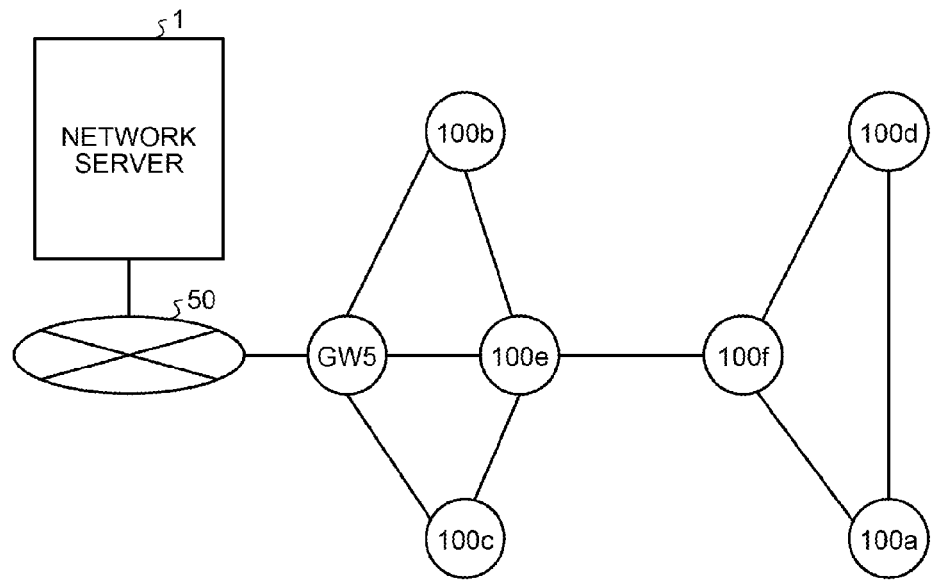
FIG. 1 is a diagram illustrating a configuration of an ad-hoc network according to an embodiment.

FIG. 1 is a diagram illustrating a configuration of the ad-hoc network in the first embodiment. As illustrated in FIG. 1, the ad-hoc network includes a network server 1, a GW 5, and nodes 100a to 100f. The network server 1 and the GW 5 are connected with each other via a network 50. The nodes 100a to 100f perform wireless communication with neighboring nodes. In the following description, the nodes 100a to 100f are collectively described as node 100 as needed. The node 100 is an example of a transmission control apparatus.

In the ad-hoc network, various data is exchanged between the nodes. In the first embodiment, the data is distinguished and described as follows. The data exchanged to update a routing information table is described as a hello message. The data to search for a redundant route is described as route search data. The response to the route search data is described as response data. The data that each node transmits to the network server 1 and others is simply described as data.

The network server 1 is a device that receives data from the node 100 via the GW 5, and performs various services. The GW 5 is a device that performs relaying of data between the node 100 and the network server 1.

Figure 2:
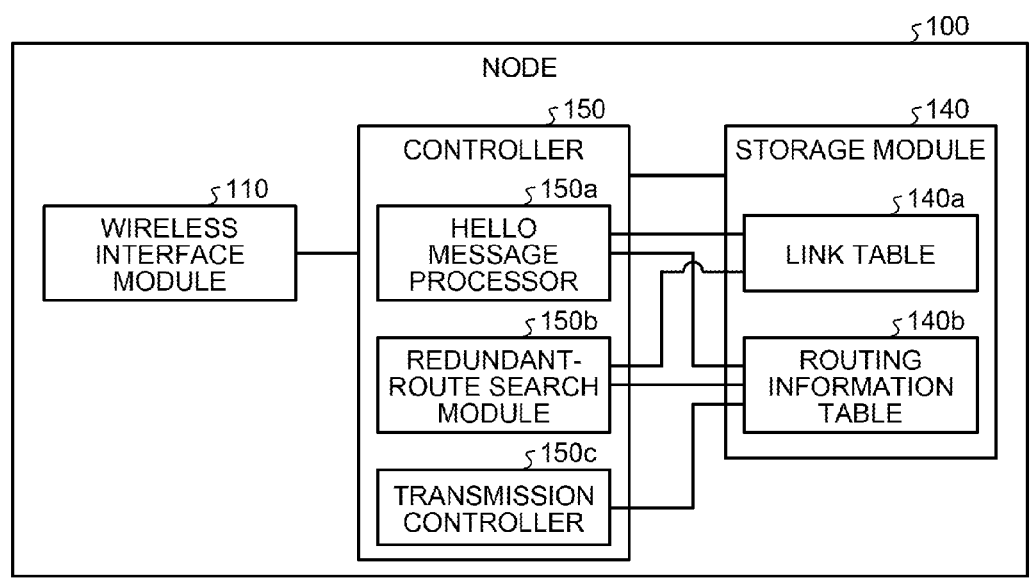
FIG. 2 is a functional block diagram illustrating a configuration of a node in the embodiment.

Each node 100 transmits data to an optimum neighboring node based on the routing information table so as to transfer the data to the destination. FIG. 2 is a functional block diagram illustrating a configuration of the nodes in the first embodiment. As illustrated in FIG. 2, the node 100 includes a wireless interface module 110, a storage module 140, and a controller 150.

The wireless interface module 110 is a device that includes an antenna, and transmits and receives data with other nodes. The controller 150, which will be described later, exchanges data with other nodes via the wireless interface module 110.

The storage module 140 is a storage device that stores therein a link table 140a and a routing information table 140b. The storage module 140 corresponds to a semiconductor memory device such as a random access memory (RAM), a read only memory (ROM), and a flash memory, or a storage device such as a hard disk and an optical disc, for example.

The link table 140a stores therein the information on the nodes that are wirelessly communicable with the node 100. For example, the link table 140a associates the information that identifies a neighboring node with address information.

Figures 3, 4, 5, 6:
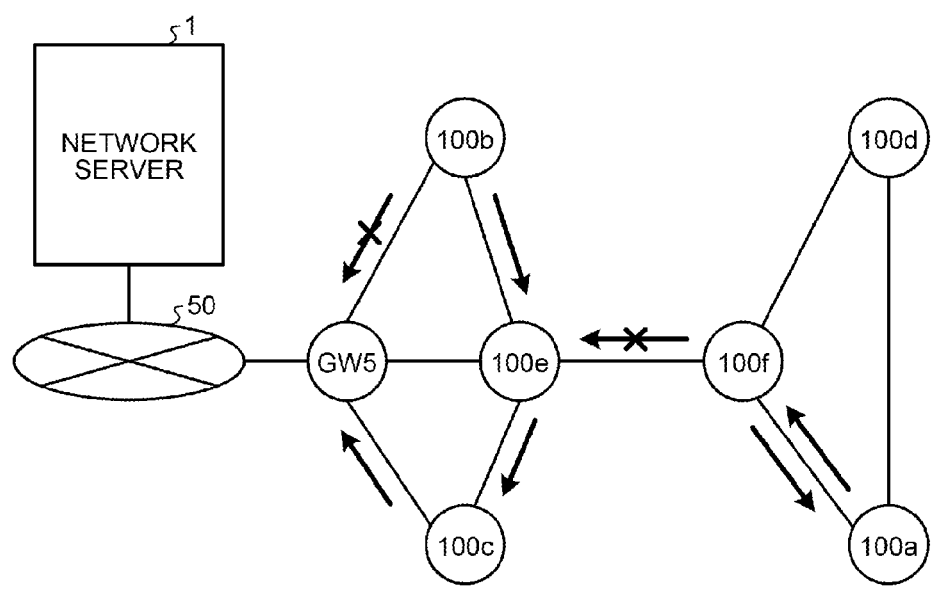
FIG. 3 is a table illustrating an example of data structure of a routing information table.
FIG. 4 is a diagram illustrating an example of data structure of route search data.
FIG. 5 is a diagram illustrating an example of data structure of data.
FIG. 6 is a diagram (part 1) for explaining a situation of data transmission in the embodiment.

The routing information table 140b stores therein a destination of data, a neighboring node, and flag information indicative of whether the route reaching the destination from the neighboring node is effective, being associated with one another. FIG. 3 is a table illustrating an example of data structure of the routing information table. As illustrated in FIG. 3, the routing information table 140b includes a global destination (GD), a local destination (LD), and the flag information. The GD out of the foregoing corresponds to the destination of data. The LD corresponds to the neighboring node. The flag information is set to a value depending on whether the route is effective. More specifically, when the appropriate route is effective, the flag information is set to true. When the appropriate route is not effective, the flag information is set to false.

In the routing information table 140b, a plurality of routes are set for one GD. Out of the routes, the route of the highest priority is described as a first candidate route. The LD corresponding to the first candidate route is described as a first candidate neighboring node. Furthermore, no value is set for the flag information corresponding to the first candidate route.

The first candidate neighboring node is registered in the first row. In the example illustrated in FIG. 3, the first candidate neighboring node corresponding to GW 5 of the GD is GW 5.

The route other than the first candidate route is described as a second candidate route. There may be a plurality of second candidate routes. The LD corresponding to the second candidate route is described as a second candidate neighboring node.

In the example in FIG. 3, the second candidate neighboring node corresponding to GW 5 of the GD is node 100e. Because the flag information corresponding to the second candidate route is true, it represents that the second candidate route is effective.

The controller 150 includes a hello message processor 150a, a redundant-route search module 150b, and a transmission controller 150c. The controller 150 corresponds to an integrated device such as an application specific integrated circuit (ASIC) and a field programmable gate array (FPGA), for example. The controller 150 further corresponds to an electronic circuit such as a CPU and a micro processing unit (MPU), for example.

The hello message processor 150a generates a hello message based on the link table 140a and the routing information table 140b and broadcasts the hello message when it comes to the transmission timing of the node 100. For example, the hello message includes the information on the GD in the routing information table, the information on the transmission source of the hello message, the information on a neighboring node of the node 100, and the information on the communication quality of a link.

Furthermore, when the hello message processor 150a receives a hello message from a neighboring node, the hello message processor 150a updates the routing information table 140b based on the hello message received. For the process of the hello message processor 150a to update the routing information table by transmitting and receiving a hello message, any conventional technologies may be used.

The redundant-route search module 150b transmits route search data to the second candidate neighboring node, and based on the transmission result, sets the flag information in the routing information table 140b to true or false.

FIG. 4 is a diagram illustrating an example of data structure of the route search data. As illustrated in FIG. 4, the route search data includes a global source (GS), a global destination (GD), a local source (LS), a local destination (LD), and a frame identification (ID). The GS is set to the node of transmission source of the route search data. The GD is set to the final destination of the route search data such as GW. The LS is set to the neighboring node of transfer source of the route search data. The LD is set to the neighboring node of transfer destination of the route search data.

The following describes the process performed when the redundant-route search module 150b transmits route search data. The redundant-route search module 150b sets the GS to the information of the node 100, the GD to GW 5, the LS to the information of the node 100, and the LD to the first candidate neighboring node; and assigns a unique number to the frame ID to generate the route search data. The redundant-route search module 150b transmits the route search data generated to the first candidate neighboring node set to the LD. Subsequently, the redundant-route search module 150b sets the LD to the neighboring nodes other than the first candidate in sequence to determine whether a route not using the route used for the first candidate is present. The method of redundant route search illustrated here is merely an example, and other conventional methods may be used.

The following describes the process performed when the redundant-route search module 150b receives response data for the route search data transmitted by the node 100. The response data includes the information of whether the route via the second candidate neighboring node to which the route search data is transmitted is effective. When the response data includes the information of being effective, the redundant-route search module 150b sets the flag information of the appropriate second candidate neighboring node to true. In contrast, when the response data includes the information of not being effective, the redundant-route search module 150b sets the flag information of the appropriate second candidate neighboring node to false.

The following describes the process performed when the redundant-route search module 150b receives route search data transmitted by another node. When the redundant-route search module 150b receives the route search data, the redundant-route search module 150b refers to the link table 140a or the routing information table 140b and transfers the route search data to a neighboring node. When transferring the route search data, the redundant-route search module 150b sets the LS of the route search data to the information of the node 100 and sets the LD to the neighboring node of transfer destination.

The redundant-route search module 150b stores therein the GS of the route search data and the neighboring node to which the route search data including the GS is transmitted, being associated with each other. The redundant-route search module 150b performs transmission control on route search data such that the route search data including the same GS is not transmitted to the already-transmitted neighboring node. When there is no neighboring node present to be the transmission destination of the route search data, the redundant-route search module 150b transmits the response data indicating that the route is not effective with the GS of the route search data as the destination.

When the GW 5 receives the route search data, the GW 5 transmits the response data indicating that the route is effective with the GS of the route search data as the destination.

The transmission controller 150c transmits data to a neighboring node based on the destination of the data and the routing information table 140b when the transmission controller 150c receives the data. FIG. 5 is a diagram illustrating an example of data structure of the data. As illustrated in FIG. 5, the data includes the GS, the GD, the LS, the LD, the frame ID, and user data.

The following describes the process performed when the transmission controller 150c receives data from another node. When the transmission controller 150c receives the data, the transmission controller 150c compares the GD of the data with the routing information table 140b and transmits the data to the first candidate neighboring node for the GD. When transmitting the data, the transmission controller 150c sets the LS in the data to the information of the node 100 and sets the LD to the neighboring node of transfer destination.

The following describes the process performed when the transmission controller 150c fails to perform data transmission to the first candidate neighboring node. The transmission controller 150c refers to the routing information table 140b and selects a second candidate neighboring node of which the flag information is true and to which the data has not yet been transmitted. The transmission controller 150c transmits the data to the second candidate neighboring node selected. When transmitting the data, the transmission controller 150c sets the LS in the data to the information of the node 100 and sets the LD to the neighboring node of transfer destination.

The transmission controller 150c repeats the above-described process each time the data transmission to a second candidate neighboring node fails.

The following describes the process performed when the transmission controller 150c no longer has a second candidate neighboring node to be the target of transmission. When the GS in the data is the node 100, the transmission controller 150c discards the data. In contrast, when the GS in the data is not the node 100, the transmission controller 150c transmits the data with the GS in the data as the destination. Alternatively, the transmission controller 150c may return the data to the LS of when the data is received.

The following describes the situation of data transmission performed by the transmission controller 150c in the foregoing with reference to FIG. 6. FIG. 6 is a diagram (part 1) for explaining the situation of data transmission in the first embodiment. In the ad-hoc network illustrated in FIG. 6, it is assumed that the communication between the node 100b and the GW 5 is cut off. It is further assumed that the communication between the node 100e and the node 100f is cut off.

First, attention is paid to the node 100b. It is assumed that the information illustrated in FIG. 3 is registered in the routing information table 140b of the node 100b.

When the node 100b receives data in which the GD is set to GW 5, the node 100b transmits the data to the GW 5 that is the first candidate neighboring node based on the routing information table 140b. When the communication between the node 100b and the GW 5 is cut off, the node 100b fails to perform the data transmission.

When the data transmission fails, the node 100b selects a second candidate neighboring node of which the flag information is true and to which the data has not yet been transmitted. In the example of the routing information table 140b illustrated in FIG. 3, the node 100b selects the neighboring node 100e.

The node 100b transmits the data to the node 100e. Subsequently, the data reaches the GW 5 via the node 100c.

Figures 7, 8:
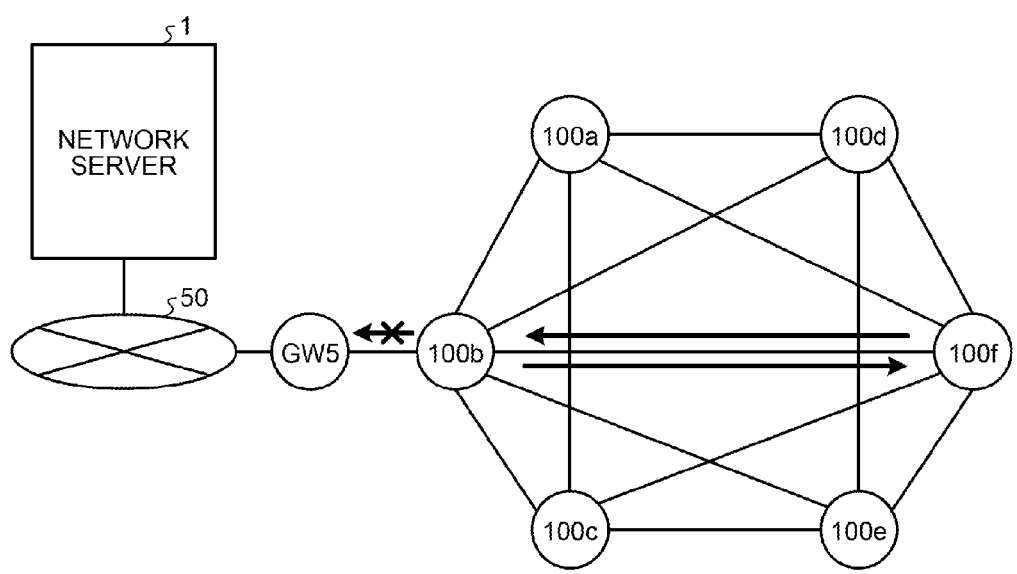
FIG. 7 is a table illustrating an example of data structure of the routing information table for a node 100*a*.
FIG. 8 is a diagram (part 2) for explaining the situation of data transmission in the embodiment.

Next, the attention is paid to the node 100a. It is assumed that the information illustrated in FIG. 7 is registered in the routing information table 140b of the node 100a. FIG. 7 is a table illustrating an example of data structure of the routing information table of the node 100a. In the example illustrated in FIG. 7, the first candidate neighboring node is the node 100f and the second candidate neighboring node is the node 100d. The transmission source of data is assumed to be the node 100a.

The node 100a sets the GD to GW 5 and sets the GS to 100a, and based on the route information table, transmits data to the first candidate neighboring node 100f. When the communication between the node 100e and the node 100f is cut off, the data transmission fails, and thus the node 100a receives the data from the node 100f.

When the data transmission fails, the node 100a selects a second candidate neighboring node of which the flag information is true and to which the data has not yet been transmitted. In the routing information table 140b in FIG. 7, however, there is no second candidate neighboring node present to be the second candidate neighboring node of which the flag information is true and to which the data has not yet been transmitted. Furthermore, because the transmission source of data is the node 100a, the node 100a discards the data.

Descried next using the ad-hoc network illustrated in FIG. 8 is the situation of transmitting data. FIG. 8 is a diagram (part 2) for explaining the situation of data transmission in the first embodiment. In the ad-hoc network illustrated in FIG. 8, it is assumed that the communication between the node 100b and the GW 5 is cut off. The attention is paid to the node 100b and the node 100f.

It is assumed that the information illustrated in FIG. 9 is registered in the routing information table 140b of the node 100b. It is further assumed that the information illustrated in FIG. 10 is registered in the routing information table 140b of the node 100f.

FIG. 9 is a table illustrating an example of data structure of the routing information table of the node 100b. In the example illustrated in FIG. 9, the first candidate neighboring node is GW 5. The second candidate neighboring nodes are the nodes 100a, 100d, 100f, 100e, and 100c.

FIG. 10 is a table illustrating an example of data structure of the routing information table of the node 100f. In the example illustrated in FIG. 10, the first candidate neighboring node is 100b. The second candidate neighboring nodes are the nodes 100a, 100d, 100c, and 100e.

In the description of FIG. 8, the transmission source of data is assumed to be the node 100f. The node 100f sets the GD to GW 5 and sets the GS to node 100f, and based on the routing information table 140b, transmits data to the first candidate neighboring node 100b.

The node 100b receives the data from the node 100f. When the node 100b receives the data in which the GD is set to GW 5, the node 100b transmits the data to the GW 5 of the first candidate neighboring node based on the routing information table 140b. When the communication between the node 100b and the GW 5 is cut off, the node 100b fails to perform the data transmission.

When the data transmission fails, the node 100b selects a second candidate neighboring node of which the flag information is true and to which the data has not yet been transmitted. In the routing information table 140b in FIG. 9, however, there is no second candidate neighboring node present to be the second candidate neighboring node of which the flag information is true and to which the data has not yet been transmitted. Furthermore, because the transmission source of data is the node 100f, the node 100b transmits the data to the node 100f.

The node 100f receives the data from the node 100b. The node 100f has transmitted the data to the first candidate neighboring node already. Consequently, the node 100f selects a second candidate neighboring node of which the flag information is true and to which the data has not yet been transmitted. However, in the routing information table 140b in FIG. 10, there is no second candidate neighboring node present to be the second candidate neighboring node of which the flag information is true and to which the data has not yet been transmitted. Furthermore, because the transmission source of data is the node 100f, the node 100f discards the data.

Figure 11:
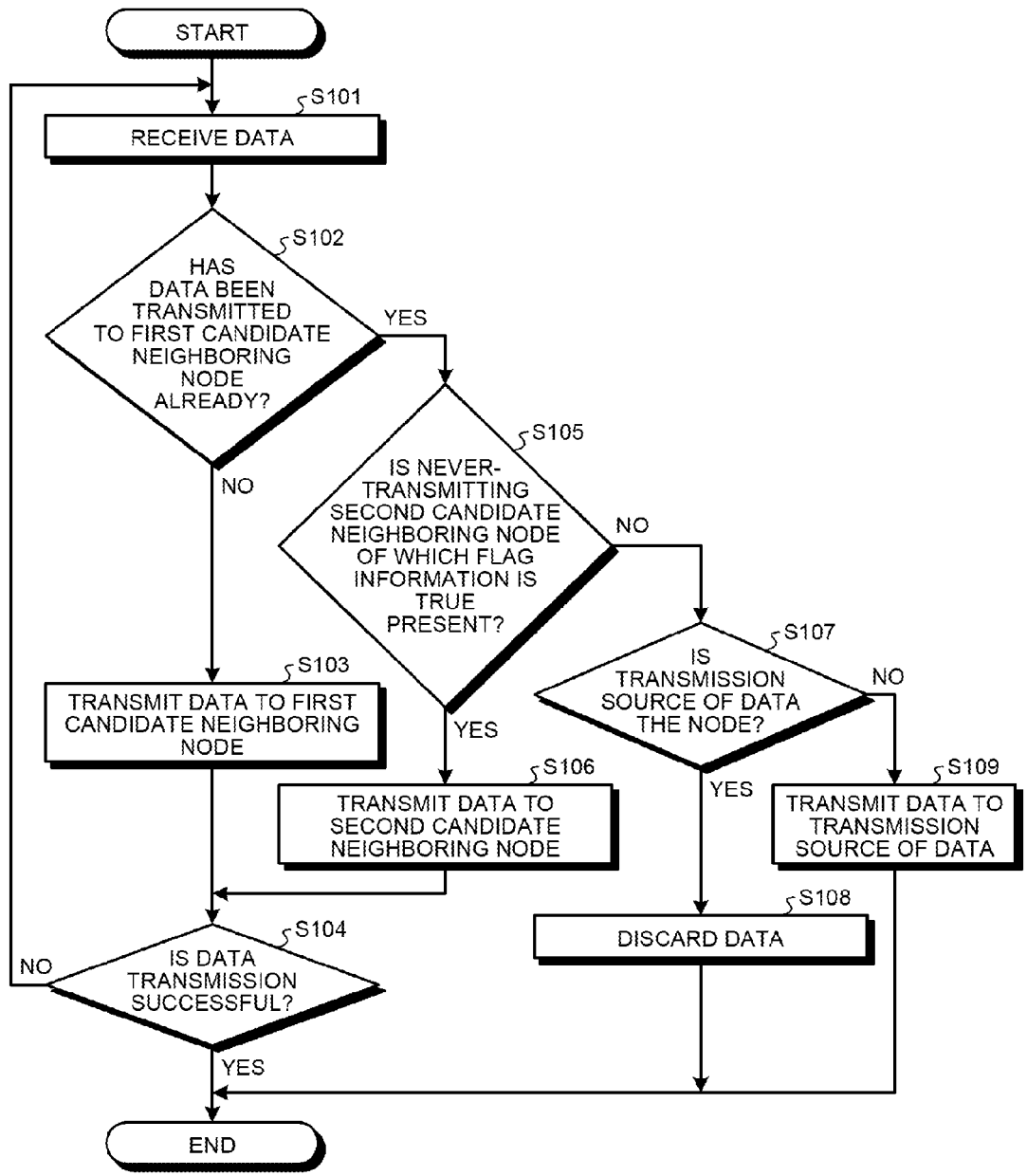
FIG. 11 is a flowchart illustrating an example of a procedure for a process performed in the node in the embodiment.

The following describes a procedure for the process performed in the node in the first embodiment. FIG. 11 is a flowchart illustrating an example of the procedure for the process performed in the node in the first embodiment. The process illustrated in FIG. 11 is executed on the occasion of receiving data, for example.

As illustrated in FIG. 11, the node 100 receives data (Step S101), and determines whether the data has already been transmitted to the first candidate neighboring node (Step S102). When the data has not been transmitted to the first candidate neighboring node yet (No at Step S102), the node 100 transmits the data to the first candidate neighboring node (Step S103).

When the data transmission is successful (Yes at Step S104), the node 100 ends the process. In contrast, when the data transmission fails (No at Step S104), the node 100 moves on to Step S101.

At Step S102, when the data has already been transmitted to the first candidate neighboring node (Yes at Step S102), the node 100 determines whether a never-transmitting second candidate neighboring node of which the flag information is true is present (Step S105).

When the never-transmitting second candidate neighboring node of which the flag information is true is present (Yes at Step S105), the node 100 transmits the data to the second candidate neighboring node (Step S106) and moves on to Step S104.

Meanwhile, when no never-transmitting second candidate neighboring node of which the flag information is true is present (No at Step S105), the node 100 determines whether the transmission source of the data is the node 100 (Step S107).

When the transmission source of the data is the node 100 (Yes at Step S107), the node 100 discards the data (Step S108). When the transmission source of the data is not the node 100 (No at Step S107), the node 100 transmits the data to the transmission source of data (Step S109).

The following describes the effect of the node 100 in the first embodiment. When the node 100 in the first embodiment fails to perform data transmission to the first candidate neighboring node, the node 100 retransmits the data by selecting a second candidate neighboring node of which the flag information is true and to which the data has not yet been transmitted. This can avoid the transmission of data to the route in which a redundant route is not effective, and thus can avoid the congestion in the ad-hoc network.

Furthermore, when there is no second candidate neighboring node present to be the second candidate neighboring node of which the flag information is true and to which the data has not yet been transmitted, the node 100 refers to the transmission source of data. When the transmission source of the data is the node 100, the node 100 discards the data. When the transmission source of the data is another node, the node 100 transmits the data to the transmission source of data. This can avoid the repetitive retransmission of data, and thus can avoid the congestion in the ad-hoc network.

While the node 100 has been exemplified to perform data communication with one another via wireless communication in the first embodiment as one example, it is not restricted to this. For example, the node 100 may be connected with one another in a wired manner to perform the data communication with one another.

Moreover, the node 100 may be equipped with a sensor that acquires environmental information. The environmental information corresponds to the information of temperature, humidity, and precipitation, for example. Each node 100 may transmit the environmental information measured by the node 100 to the network server 1.

Figure 12:
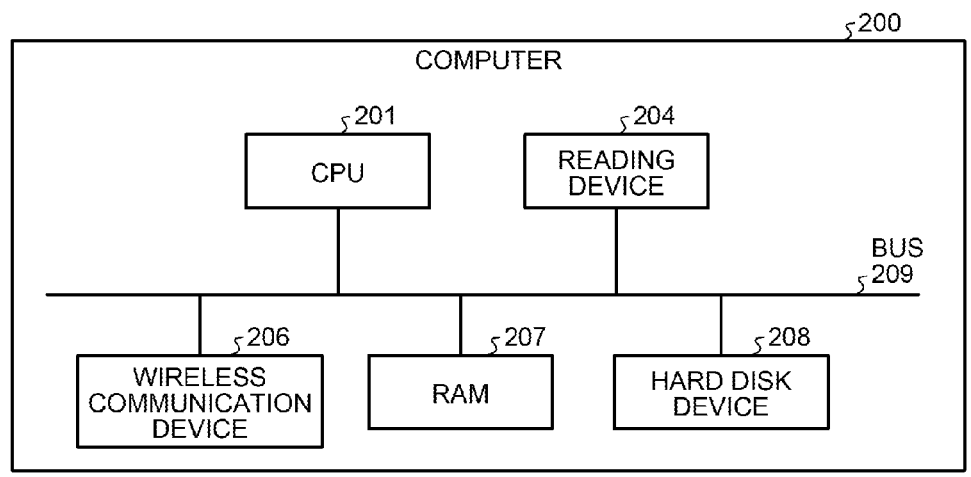
FIG. 12 is a block diagram illustrating a hardware configuration of a computer constituting the node in the embodiment.
Figure 13:
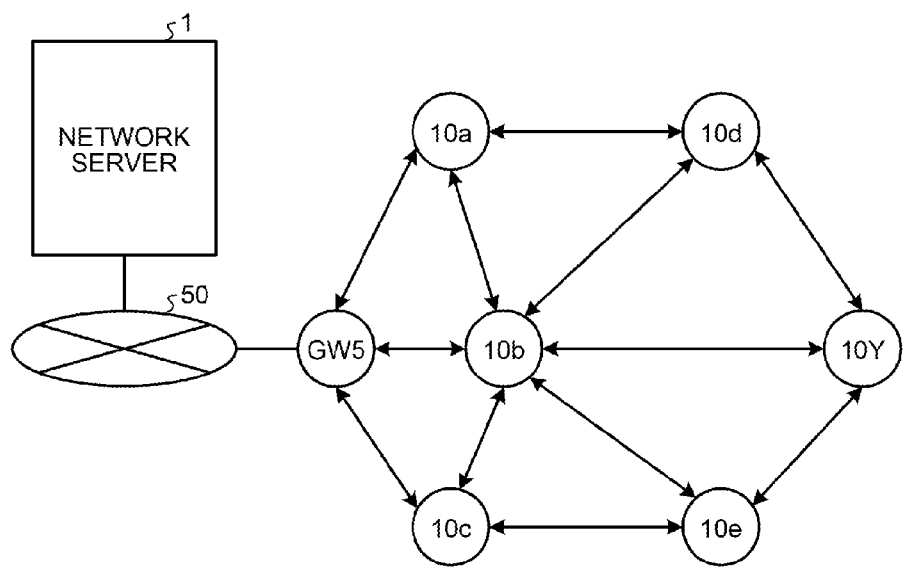
FIG. 13 is a diagram illustrating an example of a configuration of a conventional ad-hoc network.
Figure 14:
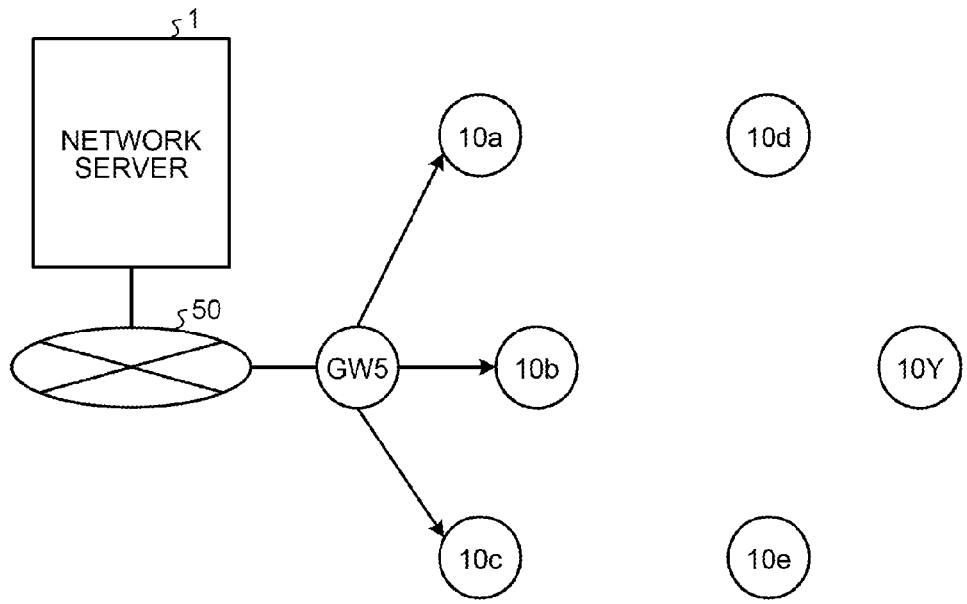
FIG. 14 is a diagram (part 1) for explaining an example of conventional nodes constructing routes.
Figure 15:
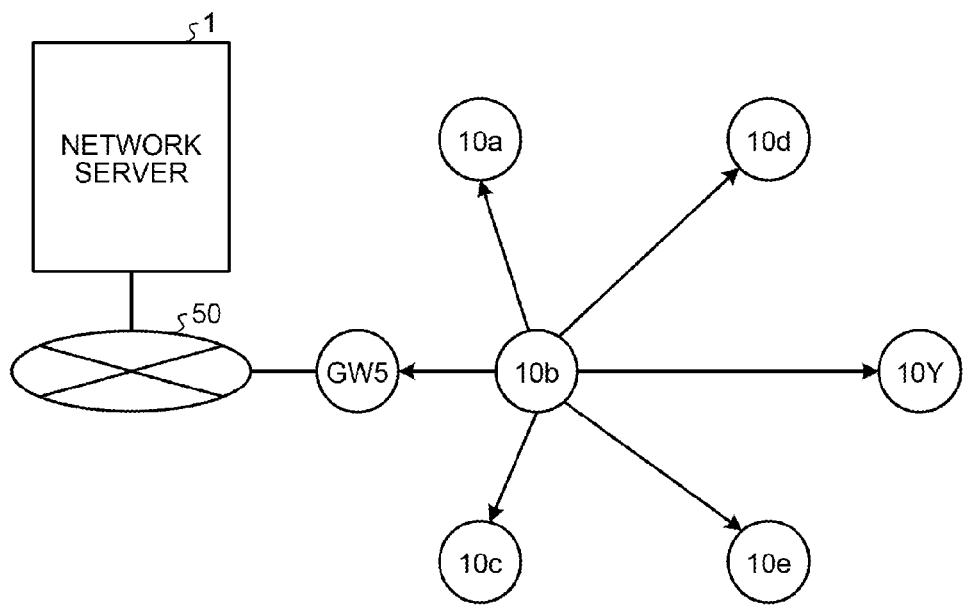
FIG. 15 is a diagram (part 2) for explaining the example of the conventional nodes constructing the routes.
Figure 16:
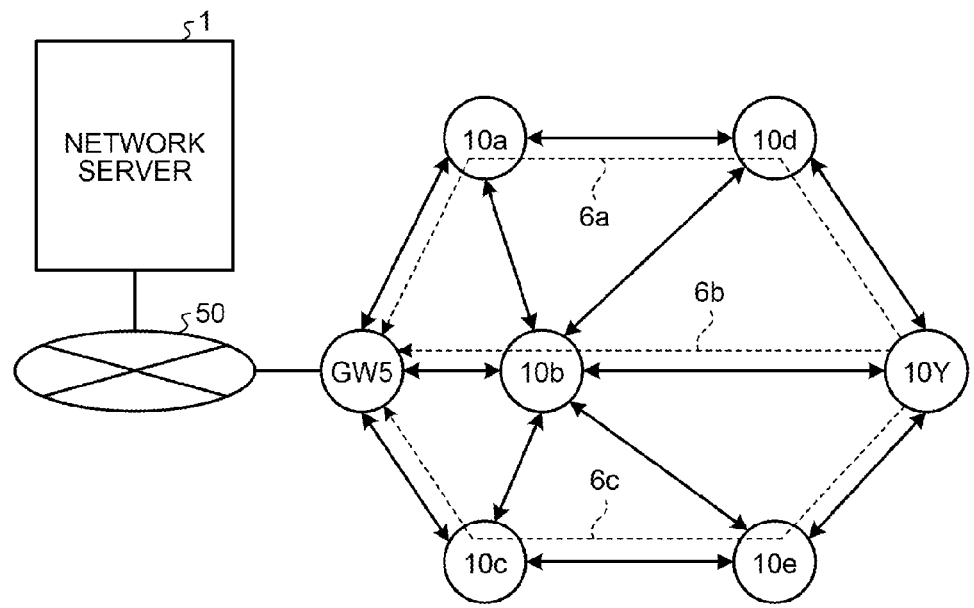
FIG. 16 is a diagram (part 3) for explaining the example of the conventional nodes constructing the routes.
Figure 17:
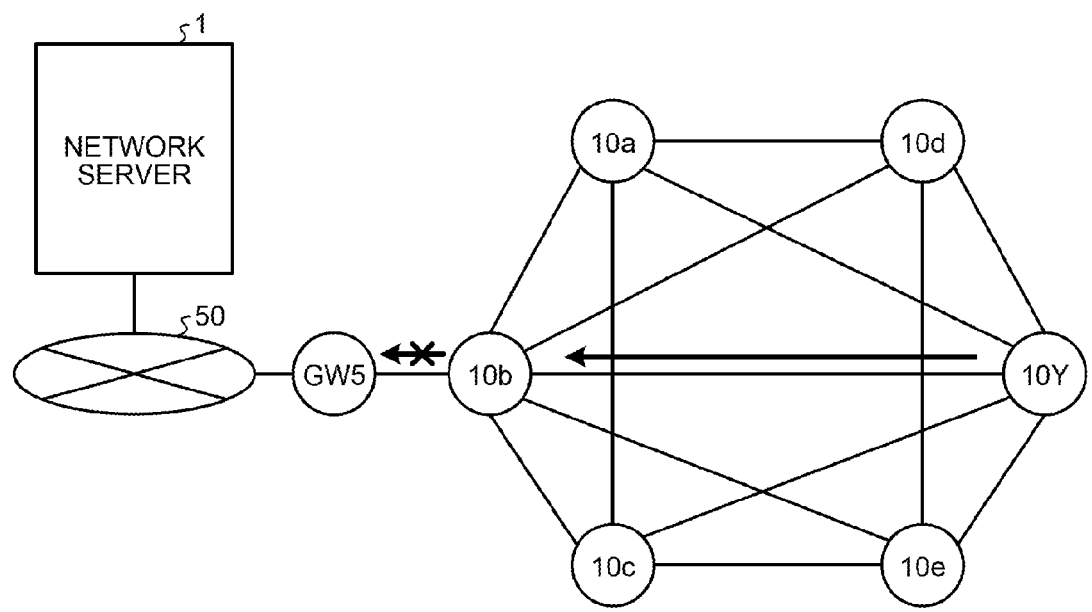
FIG. 17 is a diagram (part 1) for explaining an example of the occurrence of congestion.
Figure 18:
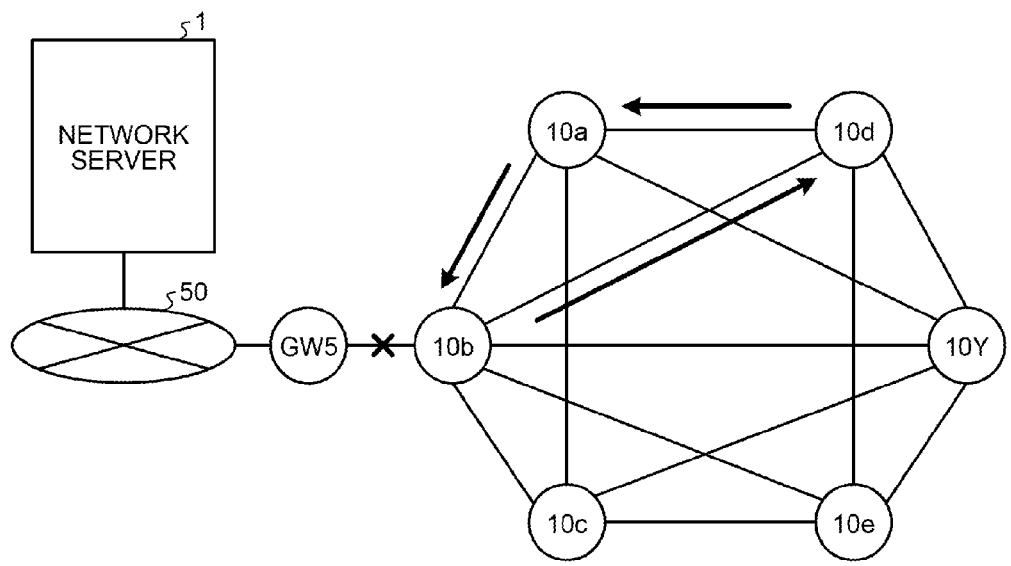
FIG. 18 is a diagram (part 2) for explaining the example of the occurrence of the congestion.
Figure 19:
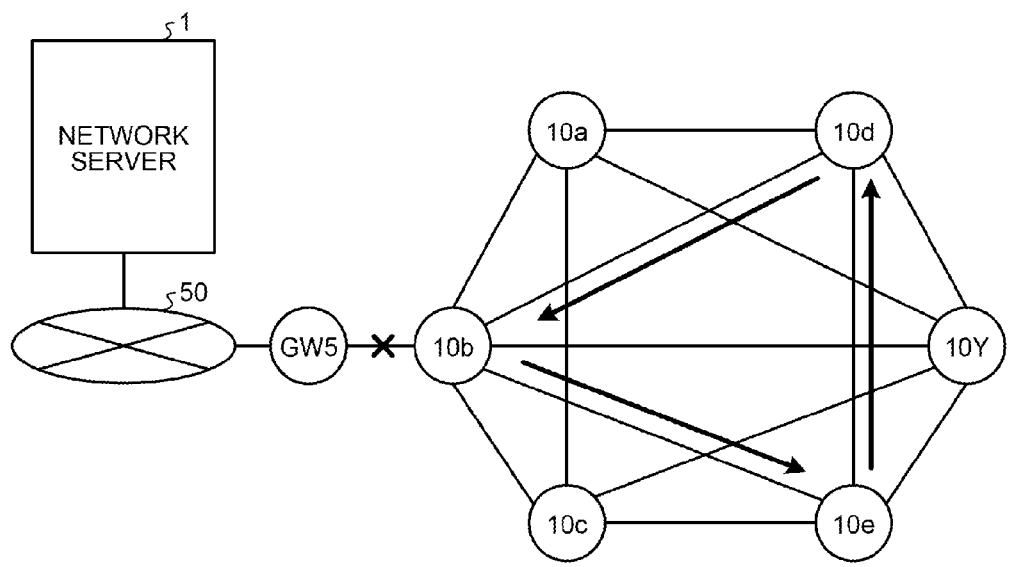
FIG. 19 is a diagram (part 3) for explaining the example of the occurrence of the congestion.

The functions of the node 100 illustrated in the first embodiment can be implemented by installing various functions corresponding to the node on a known information processing apparatus such as a personal computer (PC) and a personal digital assistant (PDA). FIG. 12 is a block diagram illustrating a hardware configuration of a computer constituting the node in the first embodiment.

As illustrated in FIG. 12, a computer 200 includes a CPU 201 that executes various arithmetic processes. The computer 200 further includes a reading device 204 that reads out programs and others from a storage medium. The computer 200 further includes a wireless communication device 206 that wirelessly connects with other devices, a RAM 207 that temporarily stores therein a variety of information, and a hard disk device 208. The various devices 201 to 208 are connected to a bus 209.

The hard disk device 208 stores therein various programs such as a transmission control program.

The CPU 201 reads out the respective programs stored in the hard disk device 208 and loads them on the RAM 207 to perform various processes. The programs can make the computer function as the transmission controller 150c in FIG. 2, for example.

The programs in the foregoing are not necessarily stored in the hard disk device 208. For example, the computer 200 may be configured to read out and execute the programs stored in a storage medium such as a CD-ROM. Furthermore, the programs may be stored in a storage device connected to a public line, the Internet, a local area network (LAN), a wide area network (WAN), and others. In this case, the computer 200 may be configured to read out the programs from the foregoing and execute them.

The disclosed transmission control method has an effect in that the occurrence of congestion can be prevented.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission control method performed by a node constituting an ad-hoc network, the transmission control method comprising:
   transmitting data to a first candidate neighboring node for a destination of data selected by referring to a routing information table stored in a storage module, the routing information table associating the destination of data with a neighboring node and flag information indicative of whether a route reaching the destination from the neighboring node is effective, wherein when the flag information is effective, the data can reach the neighboring node and the destination from the neighboring node,
   when the flag information is not effective, the data can reach the neighboring node but the data cannot reach the destination from the neighboring node;
   determining whether a route reaching the destination from a second candidate neighboring node other than the first candidate neighboring node for the destination of data is effective based on flag information of the second candidate neighboring node by referring to the routing information table when the transmitting of the data fails;
   retransmitting the data to the second candidate neighboring node when the second candidate neighboring node for which the route reaching the destination from the second candidate neighboring node is effective is present as a result of the determining; and
   aborting the retransmitting of the data when no second candidate neighboring node for which the route reaching the destination from the second candidate neighboring node is effective is present.

2. The transmission control method according to claim 1, wherein the retransmitting of the data includes
   determining whether a transmission source of data is the node when the transmitting of the data transmission fails even when the data is transmitted to the second candidate neighboring node for which the route reaching the destination from the second candidate neighboring node is effective, and
   transmitting the data to a node of transmission source when the transmission source of the data is not the node, and discarding the data when the transmission source of the data is the node.

3. A transmission control apparatus comprising:
   a memory; and
   a processor coupled to the memory, wherein the processor executes a process comprising:
   transmitting data to a first candidate neighboring node for a destination of data selected by referring to a routing information table stored in the memory, the routing information table associating the destination of data with a neighboring node and flag information indicative of whether a route reaching the destination from the neighboring node is effective, wherein when the flag information is effective, the data can reach the neighboring and the destination from the neighboring node,
   when the flag information is not effective, the data can reach the neighboring but the data cannot reach the destination from the neighboring node;
   determining whether a route reaching the destination from a second candidate neighboring node other than the first candidate neighboring node for the destination of data is effective based on flag information of the second candidate neighboring node by referring to the routing information table when the transmitting of the data fails;
   retransmitting the data to the second candidate neighboring node when the second candidate neighboring node for which the route reaching the destination from the second candidate neighboring node is effective is present as a result of the determining; and
   aborting the retransmitting of the data when no second candidate neighboring node for which the route reaching the destination from the second candidate neighboring node is effective is present.

4. The transmission control apparatus according to claim 3, wherein the retransmitting of the data includes
   determining whether a transmission source of data is the transmission control apparatus when the transmission of the data fails even when the data is transmitted to the second candidate neighboring node for which the route reaching the destination from the second candidate neighboring node is effective, and
   transmitting the data to a node of transmission source when the transmission source of the data is not the transmission control apparatus, and discarding the data when the transmission source of the data is the transmission control apparatus.

* * * * *